(12) United States Patent
McKechnie et al.

(10) Patent No.: US 7,614,771 B2
(45) Date of Patent: Nov. 10, 2009

(54) WIRELESS CONTROLLED LIGHT EMITTING ASSEMBLY

(75) Inventors: Keith J. McKechnie, Harrisburg, PA (US); Christopher George Daily, Harrisburg, PA (US); Ronald Martin Weber, Annville, PA (US)

(73) Assignee: Tyco Electronics Corporation, Middletown, PA (US)

( * ) Notice: Subject to any disclaimer, the term of this patent is extended or adjusted under 35 U.S.C. 154(b) by 92 days.

(21) Appl. No.: 11/773,569

(22) Filed: Jul. 5, 2007

(65) Prior Publication Data

US 2009/0009103 A1    Jan. 8, 2009

(51) Int. Cl.
*B60Q 3/04* (2006.01)

(52) U.S. Cl. .................. 362/543; 362/227; 362/545; 315/307; 315/312

(58) Field of Classification Search ........... 315/149, 315/152, 291, 294–295, 302, 307, 312, 317–318; 362/227, 543–545, 800
See application file for complete search history.

(56) References Cited

U.S. PATENT DOCUMENTS

| | | | |
|---|---|---|---|
| 7,187,141 B2* | 3/2007 | Mueller et al. | 315/362 |
| 7,202,607 B2* | 4/2007 | Kazar et al. | 315/185 S |
| 2002/0101197 A1* | 8/2002 | Lys et al. | 315/291 |
| 2002/0176259 A1* | 11/2002 | Ducharme | 362/545 |
| 2004/0032745 A1* | 2/2004 | Pederson | 362/545 |
| 2005/0104528 A1 | 5/2005 | Seo et al. | |
| 2005/0104740 A1 | 5/2005 | Stokes et al. | |
| 2006/0244622 A1 | 11/2006 | Wray | |
| 2007/0145915 A1* | 6/2007 | Roberge et al. | 315/312 |

FOREIGN PATENT DOCUMENTS

| | | |
|---|---|---|
| DE | 103 21 588 | 11/2004 |
| DE | 103 46 076 | 4/2005 |
| WO | WO 2007/072325 | 6/2007 |

OTHER PUBLICATIONS

PCT International Search Report; International Application No. PCT/US2008/007995; International Filing Date Jun. 27, 2008.

* cited by examiner

*Primary Examiner*—David Hung Vu
*Assistant Examiner*—Tung X Le (57) ABSTRACT

A light emitting assembly and a system utilizing a plurality of light emitting assemblies having a plurality of light emitting elements arranged and disposed within a sub-assembly. The assembly also includes a controller in communication with the elements, the controller being capable of receiving wireless signals and/or transmitting wireless signals, the controller also being capable of driving the elements to emit light in response to the wireless signals. The assembly further includes a power source arranged and disposed to provide electrical power to the light emitting elements. A method for providing a light emitting element display is also disclosed.

15 Claims, 10 Drawing Sheets

WIRELESS CONTROLLED LIGHT EMITTING ASSEMBLY

FIELD OF THE INVENTION

The present invention is directed to electronic components and systems. In particular, the invention is directed to light emitting components and systems.

BACKGROUND

The use of LEDs for general-purpose illumination, and in specialty lighting applications such as architectural and video display applications, has increased in recent years. Typically, manufacturers of LED lighting assemblies and design assemblies customize them for the specific LED devices that are used in the illumination displays. The electrical interconnections of the assemblies are often treated as secondary issues, and dealt with separately from the mechanical and aesthetic aspects of the lighting fixture. This frequently results in interconnection problems, such as bulky, complex, multi-conductor cable assemblies running to each of the LED assemblies or sub-assemblies. The wired interconnection arrangement increases the required physical size and weight of the module, requiring heavy support structure and poses handling problems during assembly or maintenance. In addition, a large module having large numbers of LEDs suffers from the drawback that failure of a module or controller requires replacement of the entire module, which is costly and creates additional waste and disconnection of multiple wires and/or wire assemblies.

What is needed is a lightweight light emitting assembly and system requiring less wiring, and is easily and more quickly and efficiently installed, repaired and/or replaced.

SUMMARY OF THE INVENTION

One aspect of an embodiment of the present invention includes a light emitting assembly having a plurality of light emitting elements arranged and disposed within a sub-assembly. The assembly also includes a controller in communication with the elements, the controller being capable of receiving wireless signals and/or transmitting wireless signals, the controller also being capable of driving the elements in response to the wireless signals. The assembly further includes and/or connects to a power source arranged and disposed to provide electrical power to the light emitting elements.

Another aspect of an embodiment of the present invention includes a light emitting system having a plurality of light emitting assemblies, the light emitting assemblies each having a plurality of light emitting elements arranged and disposed within a sub-assembly. The assemblies also include a controller in communication with the elements, the controller being capable receiving wireless signals and/or transmitting wireless signals. The controller also is capable of driving the elements in response to the wireless signals. The system further includes a system controller capable of transmitting wireless signals to a controller in one or more assemblies.

Still another aspect of an embodiment of the present invention includes a method of providing a light emitting element display. The method includes providing a plurality of light emitting assemblies, the light emitting assemblies each having a plurality of light emitting elements arranged and disposed within a sub-assembly. A controller is in communication with the elements, the controller being capable of receiving wireless signals and/or transmitting wireless signals. The controller is also being capable of driving the elements in response to the wireless signals. Wireless signals are transmitted to the controller. The elements are driven in response to the wireless signal.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
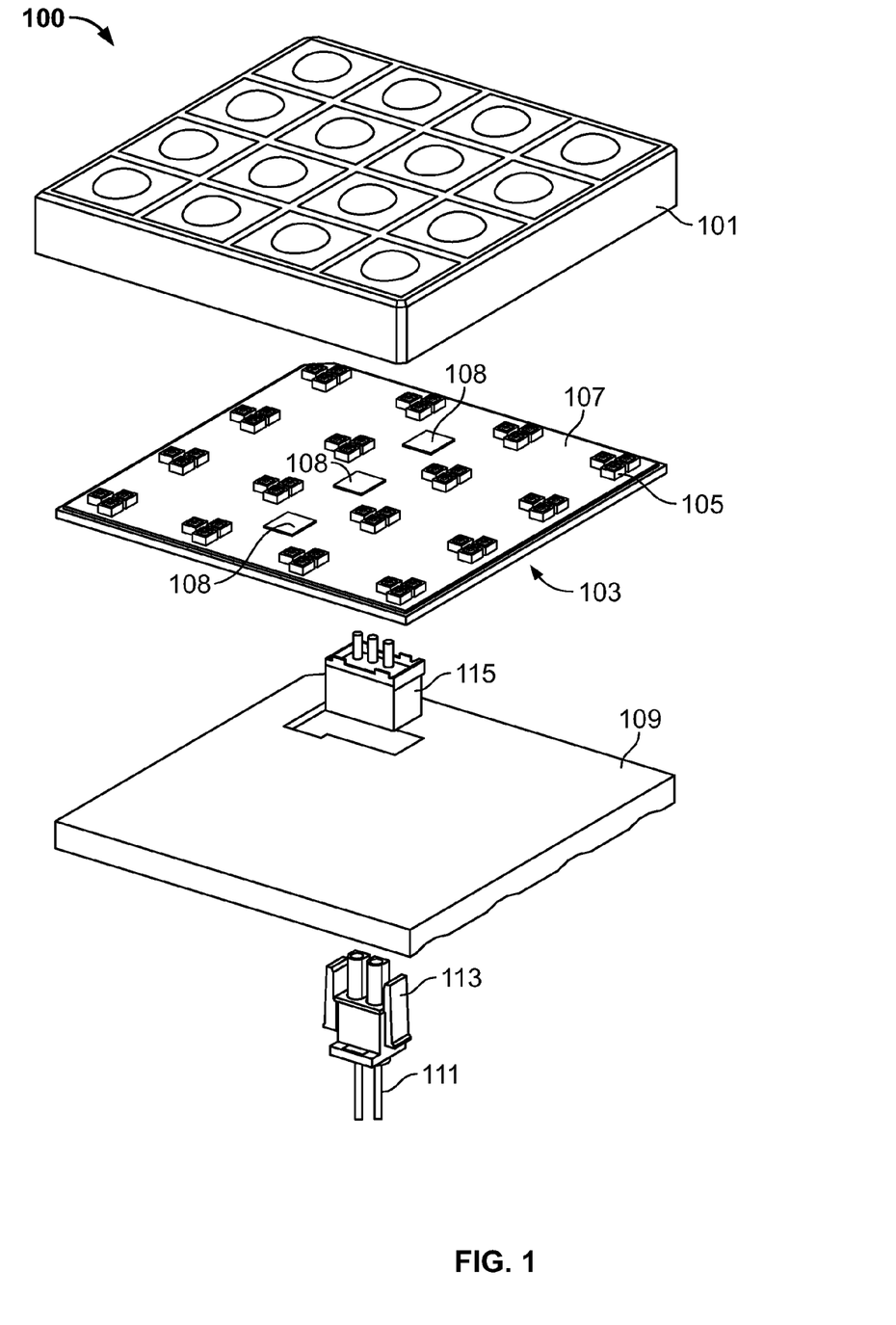
FIG. 1 is an exploded view of a light emitting assembly according to an embodiment of the present invention.

FIG. 1 shows an exploded view of a light emitting assembly 100 according to an embodiment of the disclosure, having a lens 101 arranged adjacent to a sub-assembly 103 having a plurality of light emitting elements 105. The lens 101 is an optional component that may be arranged adjacent to the light emitting elements 105 to enhance the optical characteristics of the light emitting elements 105 and/or to provide protection for the elements. For example, lens 101 may include a secondary lens array for enhanced optical properties and/or the lens may include a mechanical arrangement, such as louvers, grating or transparent covers for protection of the elements. The sub-assembly 103 includes a plurality of light emitting elements 105 mounted on a surface 107. The light emitting elements 105 may be any light emitting elements 105 known in the art for providing illumination, such as, but not limited to light emitting diodes (LEDs), laser diodes, organic light emitting diodes (OLEDs), incandescent lights, fluorescent lights, polymer light emitting diodes, emissive phosphor lights and electroluminescent lights. While the light emitting elements 105 shown in FIG. 1 are shown as including three sub-elements (e.g., red, green, and blue light emitting sub-elements, which are shown as clusters of three LEDs within the light emitting element 105 in FIG. 1), any number and color combination of sub-elements may be utilized or a single sub-element may be utilized. In addition, single light emitting elements 105 capable of displaying multiple colors in response to signals or drive current provided may also be utilized. Surface 107 is a surface capable of permitting mounting, applying, printing and/or any other configuring of components within sub-assembly 103. The surface 107 preferably includes a printed circuit board (PCB) configured to receive light emitting elements 105 and capable of having components for controlling and driving the light emitting elements 105. For example, the surface 107 may be of conventional PCB construction or flex circuit, or may include thermally conductive cladding, such as aluminum. The light emitting elements 105 are arranged on the surface 107 at regular or irregular spacings. For example, in one embodiment, the spacing between light emitting elements 105 may be any spacing desired based upon desired resolution and/or viewing distance. For example, a suitable spacing includes, but is not limited to about 12 mm. The spacing may be arranged in any desired manner and is dependent upon the desired resolution and/or power and/or illumination requirements. However, any spacing may be provided, wherein the spacing is not required to be uniform. In the embodiment shown in FIG. 1, the sub-assembly 103 includes sixteen (16) LED light emitting elements 105 mounted thereon. The LED light emitting elements 105 according to this embodiment may be single elements, multiple sub-elements or combinations thereof. In addition, the LED light emitting elements 105 or sub-elements may be any combination of colored or non-colored elements. A typical exemplary configuration for the sub-assembly 103 includes, but is not limited to, sets of three LED light emitting elements 105 having sub-elements of red, green and blue (RGB) light for controllably varying the combinations thereof to create virtually any color light. The light emitting elements 105 may be attached or configured within the sub-assembly 103 in any conventional manner that provides electrical and mechanical connectivity, such as by solder or solderless connection.

The sub-assembly 103 further includes a plurality of element drivers 108. The element drivers 108 are components of a control system for the light emitting elements 105, preferably providing selective and controlled power to light emitting elements 105 in response to a signal. "In response to a signal", as used herein, means operation of an electronic component or other device in real-time, or from stored or delayed signals or information. "Driving" the light emitting elements 105, as used herein, includes selectively and controllably activating and/or deactivating the light emitting elements 105. For example, the element drivers 108 may provide variable electrical current, pulse width modulation, color or other control to the light emitting elements 105 or sub-elements in order to drive the elements 105 or sub-elements to provide varying colors, intensity, brightness or other effects, as desired. Although the element drivers 108 are shown as separate components, the control or control system for the light emitting elements 105 may be a unitary component or any number of sub-components that provide the ability to receive and/or transmit wireless signals and selectively and controllably activate and/or deactivate the light emitting elements 105.

The light emitting assembly 100 may also include a backing plate 109 or casing configured to seal the components of the assembly 100 and provide an amount of protection from the surrounding environment. The backing plate 109 may be a potting compound or any other sealant material suitable for providing protection for the components of the assembly 100. In an alternate embodiment, the sub-assembly 103 may be mounted in or on a housing 701 (see, e.g., FIG. 7). The sub-assemblies 103 are suitable for use in various architectural and general-purpose lighting fixtures, signs and video displays, billboards, traffic signals and various other applications using light emitting elements 105. The sub-assembly 103 may be arranged in any configuration with other light emitting assemblies 100 that provides the desired visual effect.

In the embodiment shown in FIG. 1, power is provided to the assembly 100 by wire 111. Wire 111 preferably terminates at a plug 113, which is configured to be received in receptacle 115. The receptacle 115, upon connection with plug 113, provides power connections to the light emitting assembly 100. The present invention is not limited to power provided by wire 111 and may include other power sources, such a photovoltaic cells, batteries, induced power from adjacent assemblies 100 or other induced power sources or other power sources.

Figure 2A:
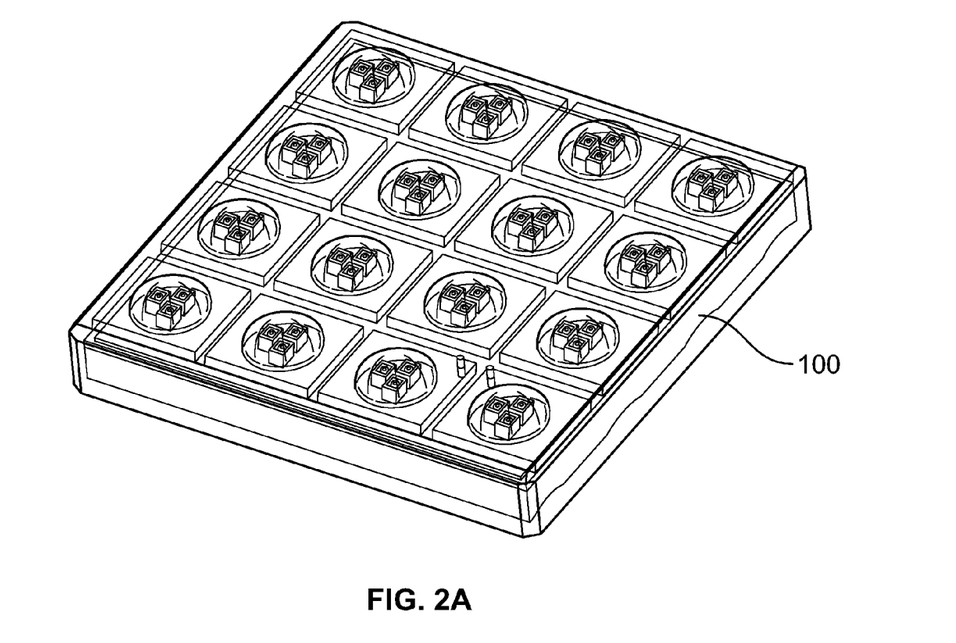
FIGS. 2A and 2B show a top and bottom perspective view of a light emitting assembly according to an embodiment of the present invention.
Figure 2B:
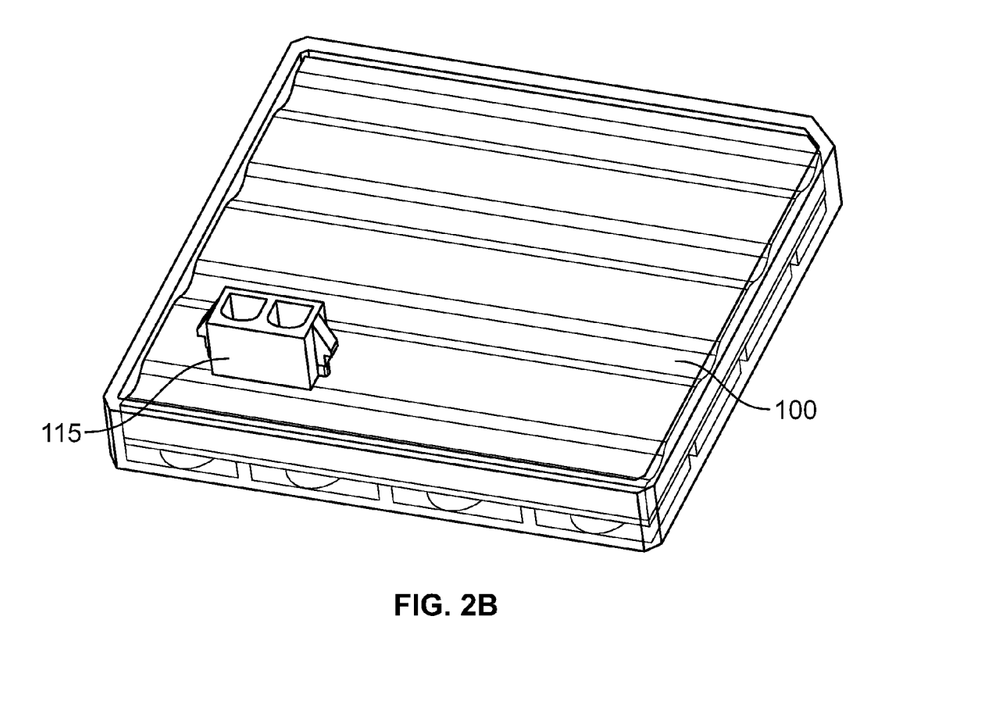

FIGS. 2A and 2B show a top and bottom perspective view of a light emitting assembly 100 according to an embodiment of the present invention. A receptacle 115 (as shown in FIG. 2B), connectable to a source of power, may provide electricity to the light emitting elements 105, element drivers 108 and assembly controller 301 (see FIG. 3). In addition, although not shown in FIG. 2B, mounting features, such as latches, hooks, indentations, protrusions, clips, channels or any other feature capable of retaining the light emitting assembly 100 in position may be used. Likewise, in an alternate embodiment, a housing 701 (see e.g., FIG. 7) may be provided wherein mounting features, such as latches, hooks, indentations, protrusions, clips, channels and/or any other features capable of retaining the light emitting assembly 100 in position are included in the housing 701.

Figure 3A:
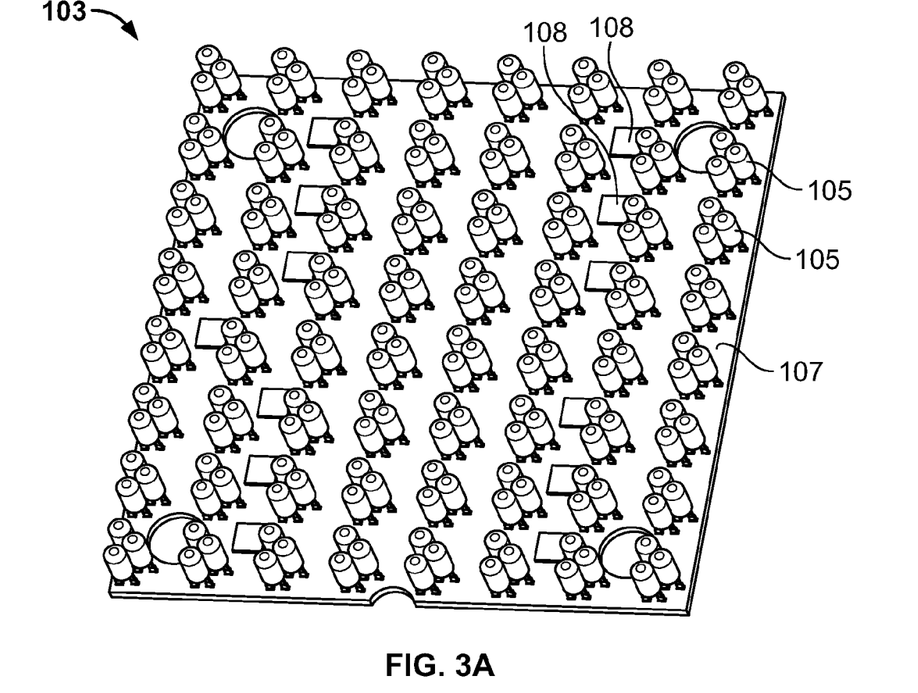
FIGS. 3A and 3B show a top and bottom perspective view of a sub-assembly according to an embodiment of the present invention
Figure 3B:
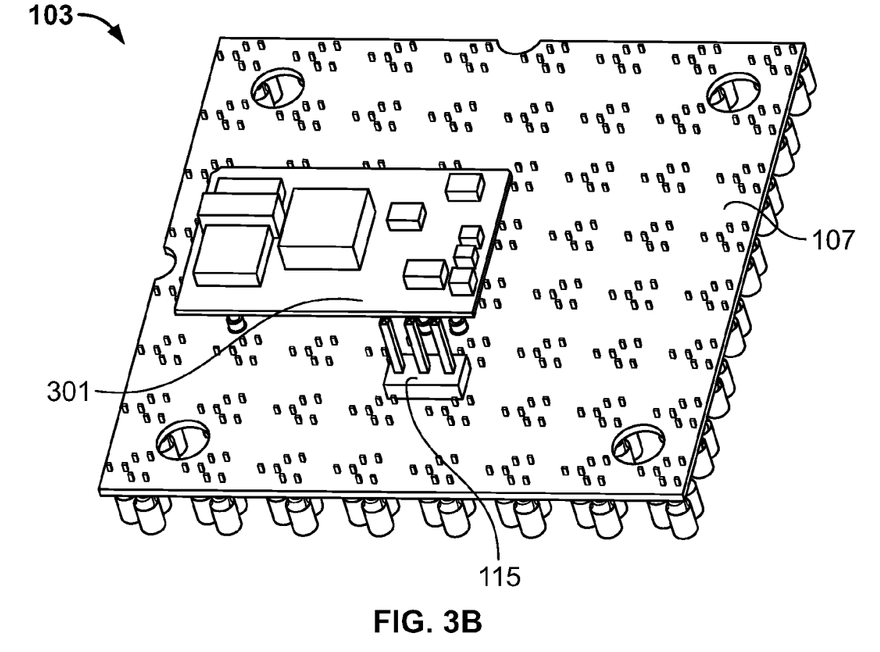

FIGS. 3A and 3B show a top and bottom perspective view of a sub-assembly 103 according to an embodiment of the present invention. Although the invention is not so limited, FIG. 3A shows an alternate arrangement of light emitting elements 105, wherein red, blue and green sub-element LEDs are arranged together in a set, wherein 64 light emitting elements 105 are arranged in an 8×8 configuration. In addition, a plurality of element drivers 108 are arranged on the surface 107 and provide selective and controlled power to the light emitting elements 105. FIG. 3B shows the underside of the surface 107, including a power receptacle 115 and assembly controller 301. The light emitting assembly 100 may also include power regulation, such as, but not limited to, a voltage regulator and/or an alternating current (AC) to direct current (DC) converter, as a separate component or a component within assembly controller 301 or element driver 108. In one embodiment of the invention, assembly controller 301 includes a wireless receiver and/or transmitter and an antenna. The assembly controller 301 may include an electronic control system capable of some or all of the following functions: sending and/or receiving wireless signals, data storage, data verification, configuration of the element driver 108, control of light emitting elements 105 or sub-elements, power regulation, diagnostics for the light emitting elements 105 and assembly circuitry and any other functions that may be provided by a microprocessor or similar device. In addition, assembly controller 301 may additionally include data storage, such as flash memory or any other type of volatile or non-volatile memory storage devices. In one embodiment, the assembly controller 301 is configured to receive and/or transmit wireless signals. Wireless signals, as utilized herein, includes signals that are transmitted and/or received via electromagnetic energy waves or other method without the assistance of wires. One example of suitable wireless signals includes radio frequency waves of about 2.4 gigahertz frequency. In addition, the assembly 100 includes the sub-assembly 103 (e.g., light emitting elements 105 mounted on surface 107), the controller (e.g., the element driver 108 and/or the assembly controller 301) and a power source as separable components to facilitate repair, replacement and/or upgrade of the individual components.

Figure 4:
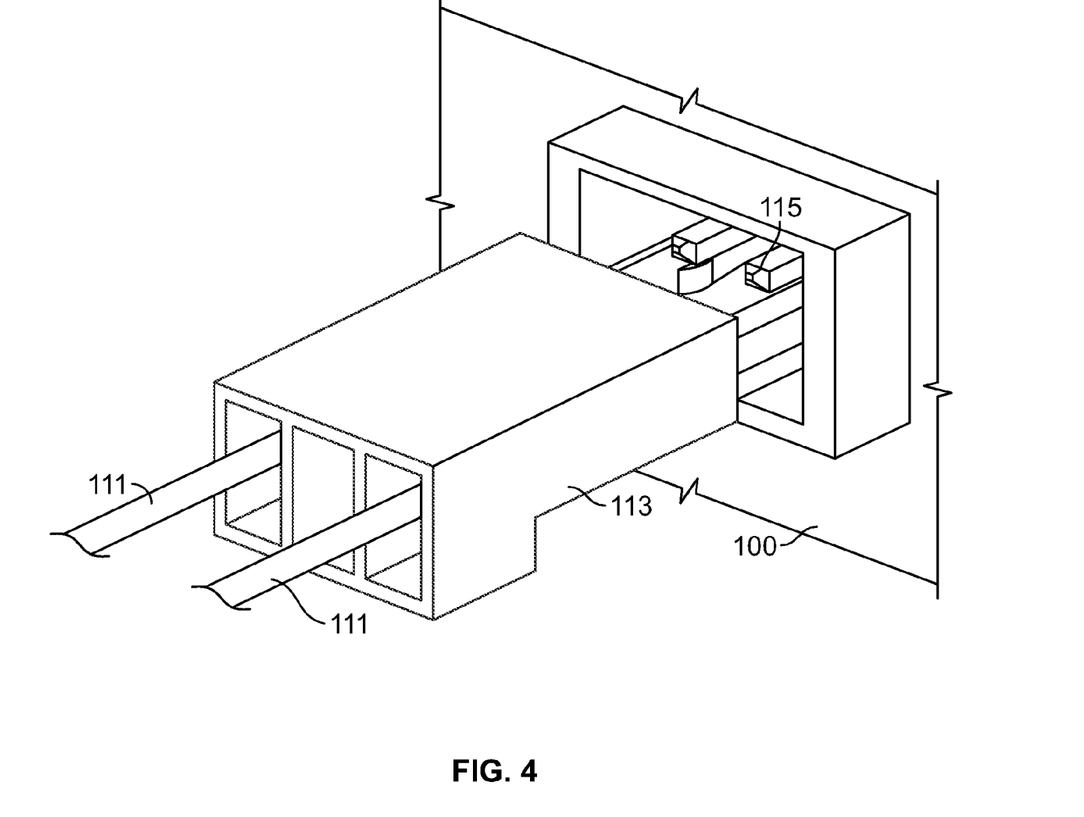
FIG. 4 shows a top perspective view of a power connection arrangement according to an embodiment of the present invention.

FIG. 4 illustrates a power connection, wherein a plug 113 and wire 111 are brought into engagement with receptacle 115. In one embodiment, the power connection merely provides power, ground and/or shielding and does not provide data or signaling to the assembly controller 301 and/or the light emitting elements 105.

Figure 5:
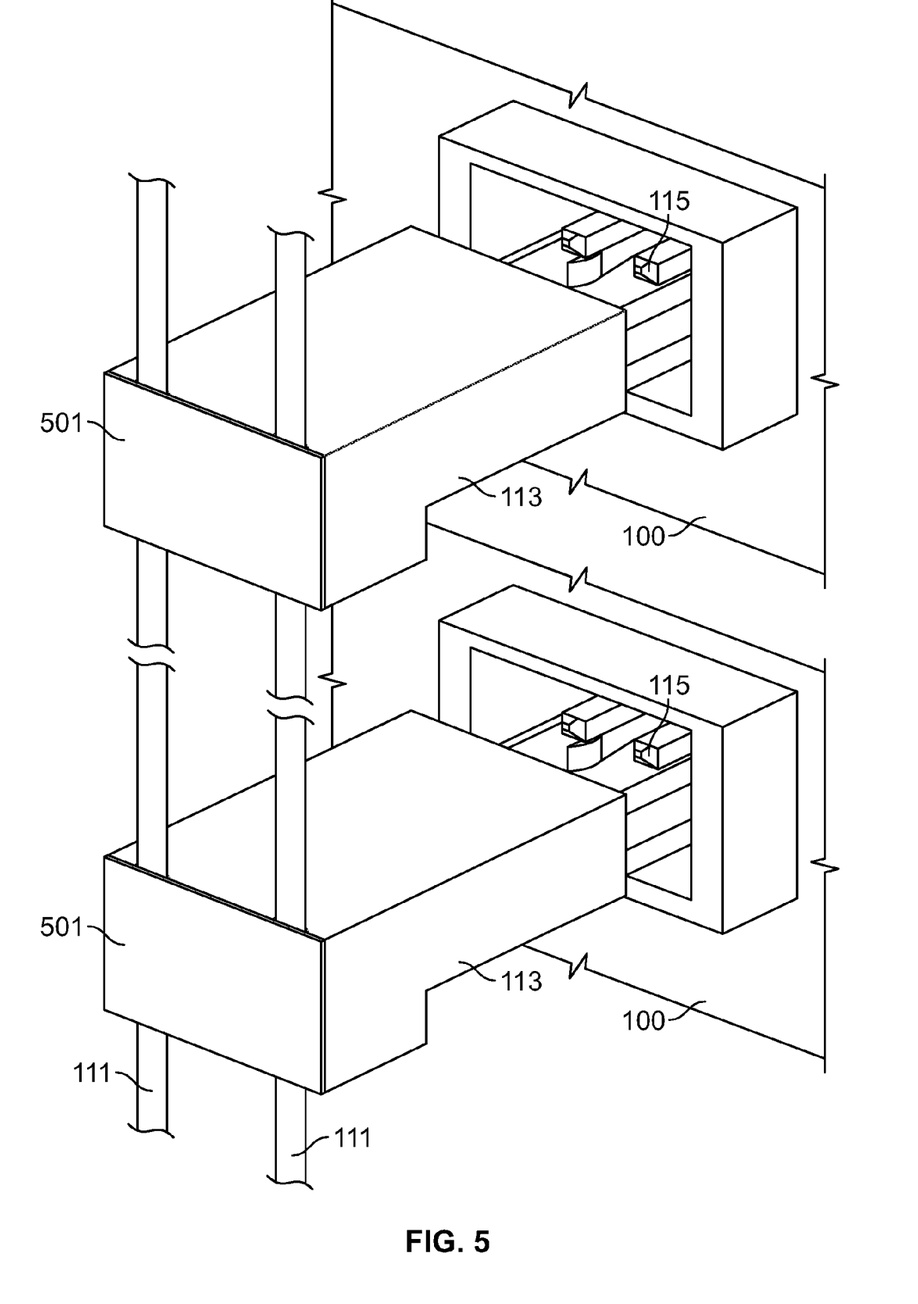
FIG. 5 shows a top perspective view of a power connection arrangement according to another embodiment of the present invention.

FIG. 5 illustrates an embodiment including an alternate arrangement of power connection, wherein a plug 113 and wire 111 are brought into engagement with receptacle 115. FIG. 5 shows receptacles 115 for two or more assemblies 100, wherein power is provided to both via wire 111. In this embodiment, the plug 113 is an insulation displacement connector 501 (IDC), wherein the wire 111 provides power and is permitted to pass through plug 113. The use of a pass through or "daisy chain" system reduces the number of wires required to power the assemblies and provides for easy, efficient connection of the assemblies to power. The present invention is not limited to the arrangement shown in FIG. 5 and may include any type of electrical connection with wire 111 that provides power to assembly 100 and allows for management of wires 111 throughout the system of assemblies 100 (see e.g., FIG. 7).

Figure 6:
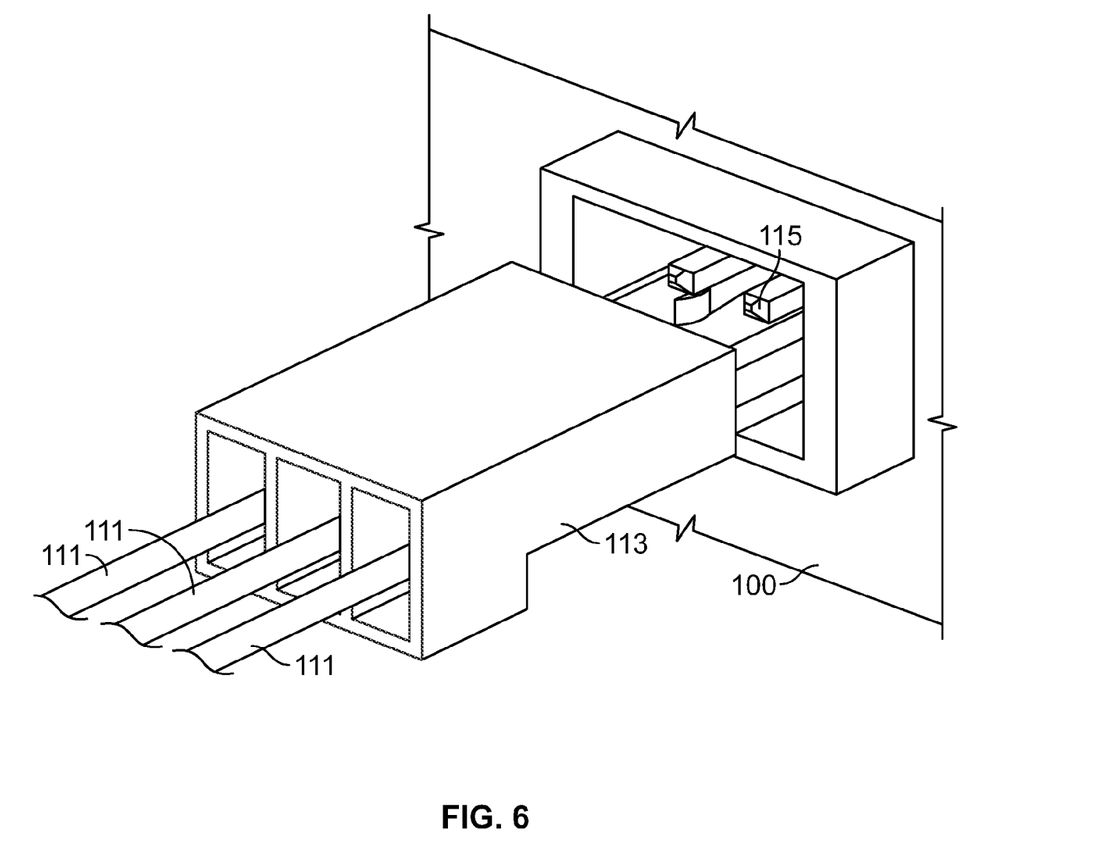
FIG. 6 shows a top perspective view of a power connection arrangement according to still another embodiment of the present invention

FIG. 6 illustrates an embodiment including another power connection, wherein a plug 113 and wire 111 are brought into engagement with receptacle 115. Plug 113 includes three wires 111, wherein a center wire 111 is of one polarity and the outer wires 111 are of a second polarity. This arrangement permits engagement of plug 113 in multiple orientations, providing greater flexibility in placement of wires 111 and decreases errors during the assembly of the system.

The present invention is not limited to the power arrangement of FIGS. 4-6 and may include any arrangement that provides power to the assemblies 100, including arrangements having or not having wires 111. In addition, the present invention is not limited to wired power connections, but also include power provided by batteries, photovoltaic cells, induced power arrangement or other power generating devices. In addition, support structures, such as support rails, may be configured to provide power to the assemblies 100.

Figure 7:
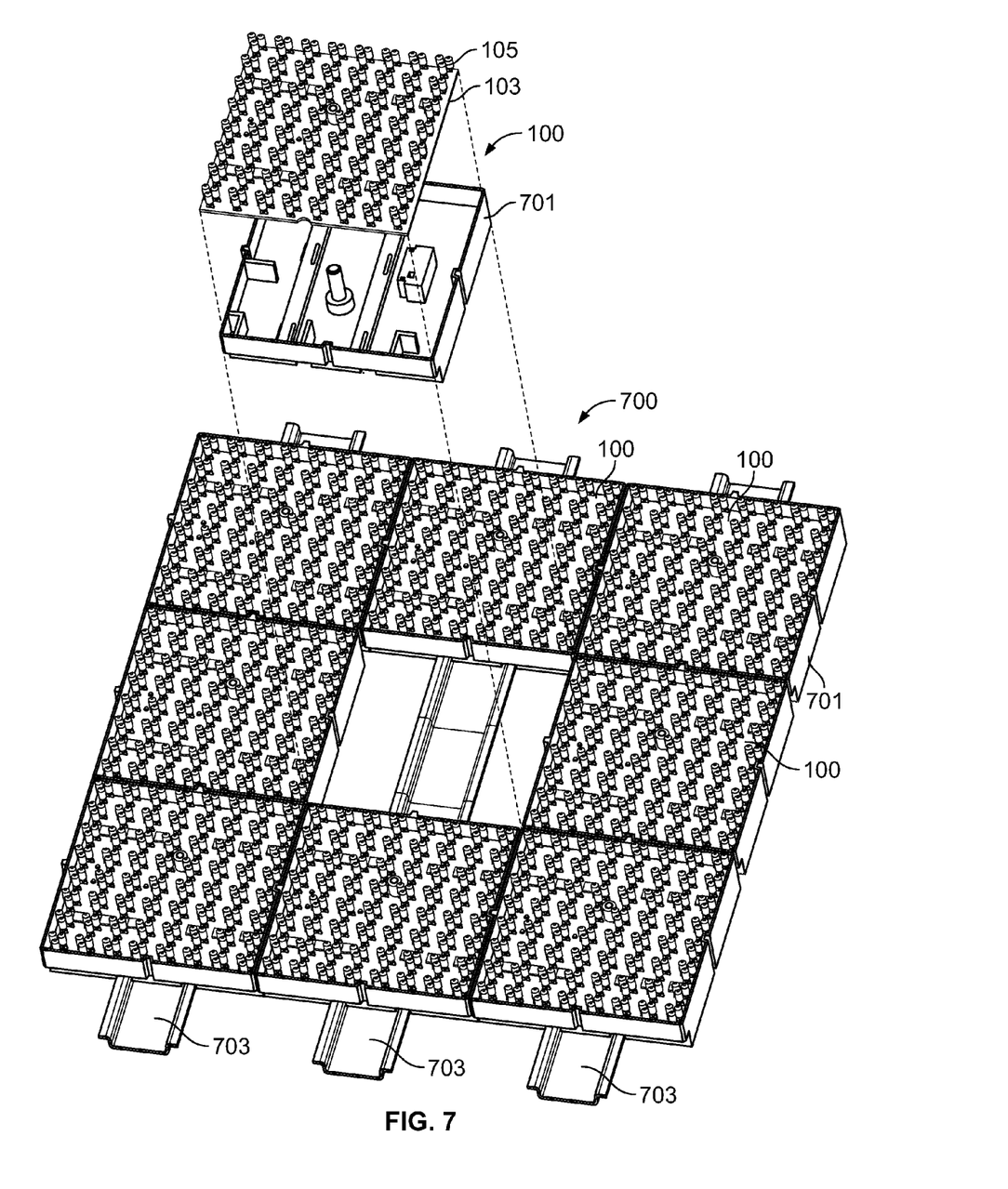
FIG. 7 illustrates a top perspective view of a system of a plurality of light emitting assemblies according to an embodiment of the present invention.

FIG. 7 illustrates a partially exploded view of a system 700 including a plurality of light emitting assemblies 100 according to an embodiment of the present invention. Each assembly 100 in FIG. 7 is supported in a housing 701 (see exploded view of removed assembly 100 in FIG. 7). The housings 701 are arranged in an adjacent grouping or bank, wherein the spacing of the light emitting elements 105 may be maintained substantially uniformly across the surface of the system 700. The housings 701 may be affixed to adjacent housings 701 or may individually be affixed to a support system and/or support components 703. Although the system 700 is shown as a square arrangement, any configuration and/or geometry of assemblies may be utilized. The present invention is not limited to the arrangement shown in FIG. 7 and may include light emitting assemblies 100 that do not include housing 701 and may include, but is not limited to, a sealing or potting material adjacent or surrounding a portion of sub-assembly 103.

Figure 8:
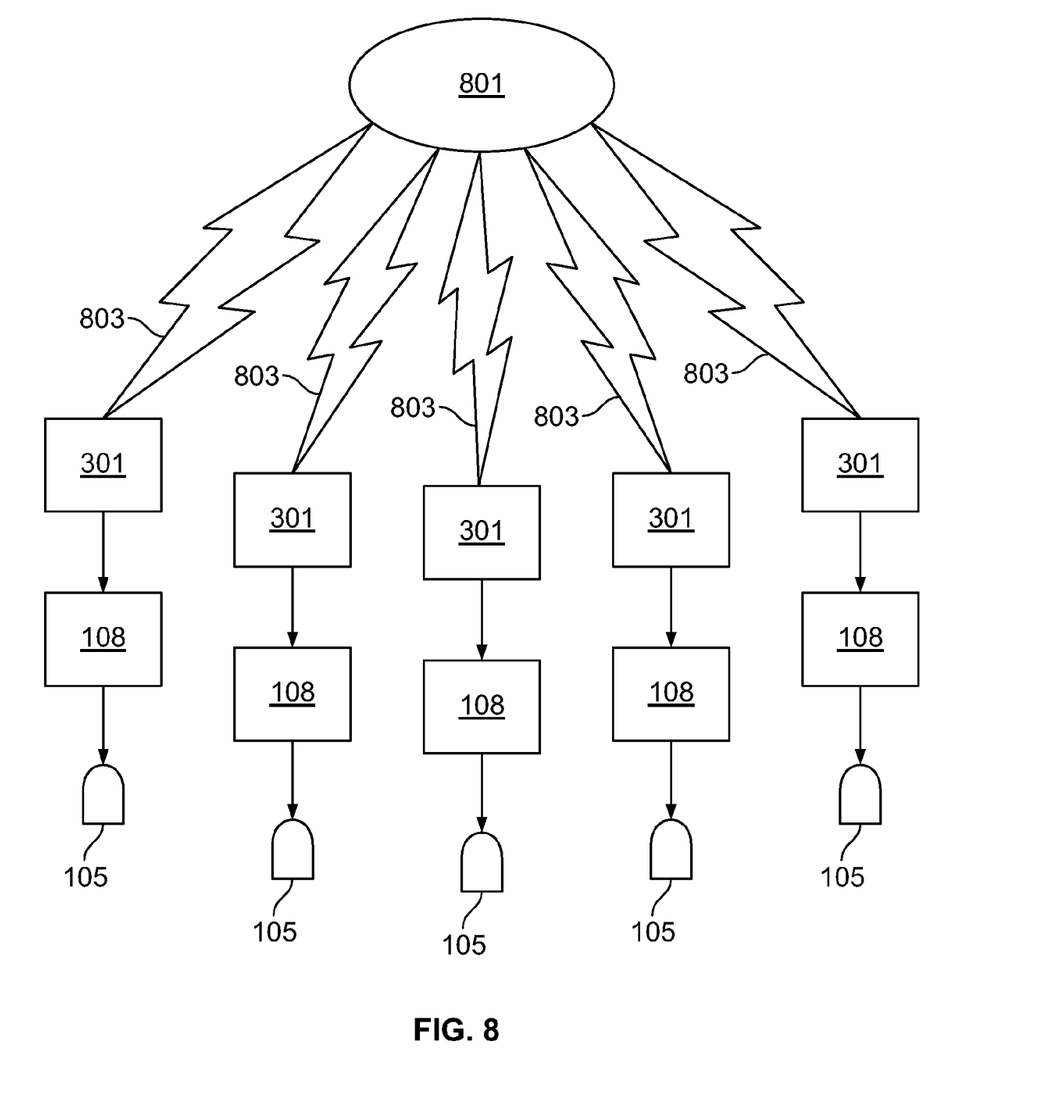
FIG. 8 schematically illustrates an arrangement according to an embodiment of the invention.

FIG. 8 illustrates a schematic arrangement according to an embodiment of the present invention. As shown in FIG. 8, signals from a system controller 801 are wirelessly transmitted to assembly controllers 301 via wireless signal 803. The system controller 801 is a transmitter or transceiver capable of transmitting or transmitting and receiving wireless signals. For example, system controller 801 is capable of providing wireless signals for configuration and/or control of assembly controller 301. The system controller 801 may be a microprocessor with a wireless transmitter, receiver, transceiver or similar device capable of transmitting and/or receiving wireless signals 803 to assembly controller 301. The system controller 801 may provide wireless signals 803 constantly or intermittently, as desired for the operation of the system. The wireless signals 803 may be addressed to predetermined assembly controllers 301. The addressed wireless signals 803 permit the signals received by the corresponding assembly controllers 301 to vary sufficiently to provide a system 700 having a plurality of assemblies 100, (FIG. 1) with each assembly 100 providing a unique light emission pattern within the system 700 via the selective and controlled activation and/or deactivation of the light emitting elements 105. Alternatively, the system controller 801 may send and/or receive a broadcast packet wireless signal 803, wherein the wireless signals 803 are not addressed and may be received by each of the assemblies. Assembly controller 301 receives and/or transmits the signal via an antenna or other wireless signal receiving device (not shown). The assembly controller 301 then analyzes the signal and optionally stores and/or processes the instructions. In addition, assembly controller 301 may transmit wireless signals 803 to the system controller 801 and/or to another device to communicate system status, diagnostic information, data verification or any other information desirable for use in configuring or operating the system. The assembly controller 301 then provides instructions to the element drivers 108 in response to the wireless signal 803. In one embodiment, the wireless signal 803 is processed by the assembly controller 301 and transmits instructions to the element drivers 108. In another embodiment, the wireless signal 803 is received by the assembly controller 301 and is stored or otherwise delayed and subsequently retrieved to transmit to the element drivers 108. The element drivers 108 selectively activate the light emitting elements 105 in response to the instructions received from the assembly controller 301. As discussed above, the invention is not limited to separate element drivers 108 and assembly controllers 301 and may include a unitary device that receives and/or transmits wireless signals 803 and also selectively controls light emitting elements 105 in response to the wireless signal 803. Likewise, more than two separate components may be utilized to provide the function of assembly controller 301 and element driver 108, provided that the components are capable of receiving and/or transmitting wireless signals 803 and instructing light emitting elements 105 in response to the signal.

Figure 9:
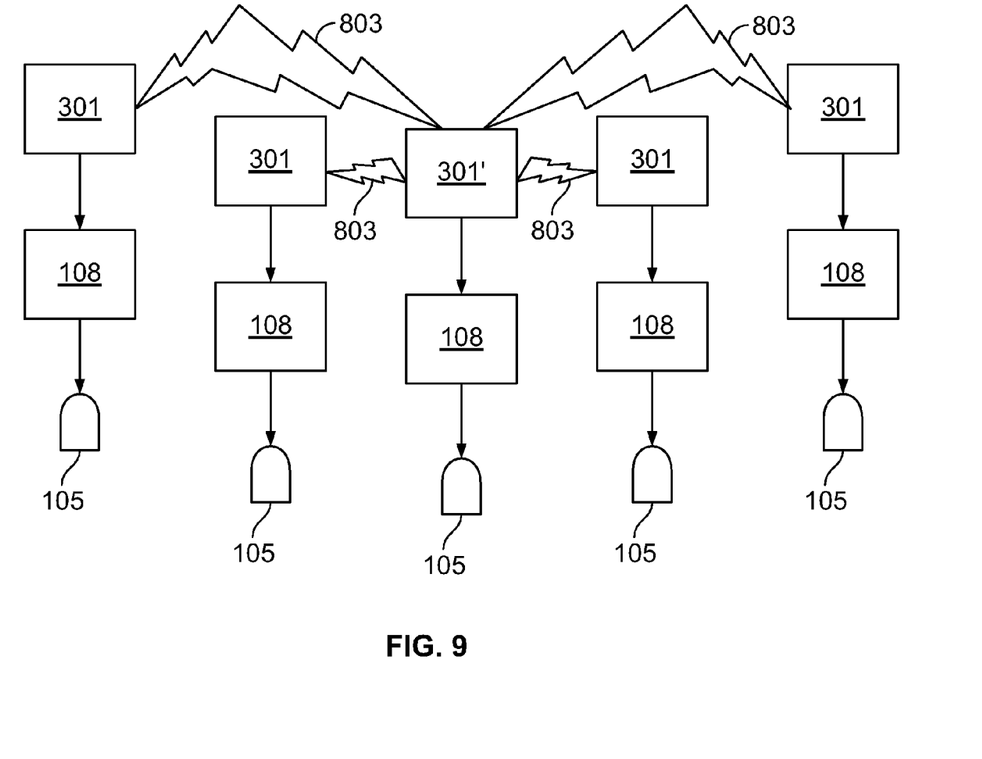
FIG. 9 schematically illustrates an arrangement according to another embodiment of the invention.

FIG. 9 illustrates another schematic arrangement according to an alternate embodiment of the present invention. The arrangement of FIG. 9 includes substantially the same arrangement of assembly controllers 301 and element drivers 108 as shown and described with respect to FIG. 8. In addition, at least one of the assembly controller 301 (shown as 301' in FIG. 9) is a transceiver device, wherein the element controller 301' is capable of both receiving wireless signals and transmitting wireless signals 803. In this embodiment, assembly controller 301' provides a wireless signal 803 to the assembly controllers 301 of the system providing instructions, which are transmitted to the element drivers 108, which operates the light emitting elements 105. The wireless signal 803 from the element controller 301' may provide synchronization, additional visual effects, and/or diagnostic information. For example, a wireless signal 803 may be transmitted from assembly controller 301' to the assembly controller 301 to reset a programmed display to a zero time in order to maintain a uniform and desired display. While FIG. 9 has been shown and described with a single transceiver assembly controller 301', a plurality or all of the assembly controllers 301 may be configured as transceivers or transmitters, wherein each assembly controller 301 is capable of communicating with other assembly controllers 301 or with other components reviewable by technicians or other personnel for the purposes of diagnostics or configuration.

Figure 10:
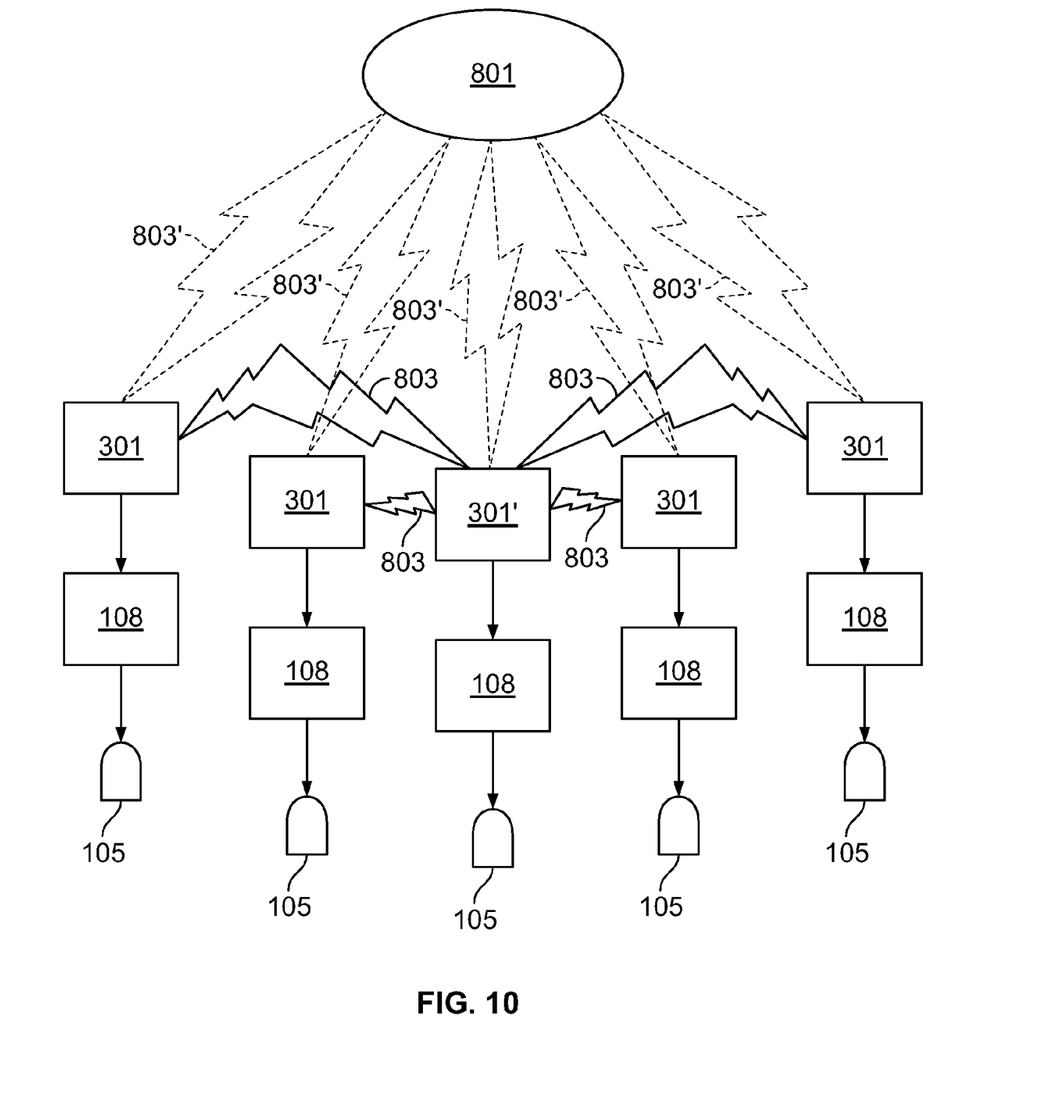
FIG. 10 schematically illustrates an arrangement according to still another embodiment of the invention.

FIG. 10 illustrates another schematic arrangement according to an alternate embodiment of the present invention. The arrangement of FIG. 10 includes substantially the same arrangement of assembly controllers 301 and element drivers 108 as shown and described with respect to FIG. 8. In addition, the embodiment shown in FIG. 10 includes a system controller 801. As shown in FIG. 9, the assembly controller 301 is a transceiver device, wherein the element controller 301' is capable of both receiving wireless signals and transmitting wireless signals 803. In this embodiment, assembly controller 301' provides a wireless signal 803 to the assembly controllers 301 of the system providing instructions, which are transmitted to the element drivers 108, which operates the light emitting elements 105. In addition, the system controller 801 provides, preferably intermittent, wireless signals 803' to configure or otherwise operate the assemblies. In addition, signals 803' may be transmitted from element controllers 301, 301' and be utilized for status, diagnostic and/or data verification. The element controller 301' and system controller 801 may provide the same or different wireless signals 803, 803' and may be utilized for the same or different functions during operation. In addition a separate remote wireless controller (not shown) may be provided to provide wireless signals including instructions and/or configurations for a plurality of system controllers 801 to provide control to multiple systems 700.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A light-emitting assembly comprising:
a substrate subassembly comprising:
a plurality of light-emitting elements, the plurality of light-emitting elements being attached to the substrate;
an element driver attached to the substrate, the element driver being in communication with the plurality of light-emitting elements and being configured to provide selective and controlled power to each of the plurality of light-emitting elements;
a controller attached to the substrate, the controller being in communication with the element driver;
a receptacle attached to the substrate, the receptacle being in communication with the controller and being configured to receive a plug;
a backing plate having an aperture positioned and configured to allow access to the receptacle; and
a housing configured to contain the substrate subassembly and the backing plate.

2. The light-emitting assembly of claim 1, wherein the controller is configured to communicate with a system controller.

3. The light-emitting assembly of claim 1, wherein the controller is configured to communicate wirelessly with a system controller.

4. The light-emitting assembly of claim 1, wherein the substrate is a printed circuit board configured to receive the plurality of light-emitting elements, the element driver, the controller, and the receptacle.

5. The light-emitting assembly of claim 1, wherein the substrate is a flex circuit configured to receive the plurality of light-emitting elements, the element driver, the controller, and the receptacle.

6. A light-emitting assembly comprising:
a substrate subassembly comprising:
a first light-emitting element attached to a substrate;
a second light-emitting element attached to the substrate;
a first element driver attached to the substrate, the first element driver being in communication with the first light-emitting element and being configured to provide selective and controlled power to the first light-emitting element;
a second element driver attached to the substrate, the second element driver being in communication with the second light-emitting element and being configured to provide selective and controlled power to the second light-emitting element; and
a first controller attached to the substrate, the first controller being in communication with the first element driver, the first controller being configured to transmit a first wireless signal to a second controller, the second controller being attached to the substrate and being in communication with the second element driver, the first wireless signal including instructions relating to control of the second element driver, the second controller being configured to receive the first wireless signal from the first controller and to control the second element driver in response to the first wireless signal.

7. The light-emitting assembly of claim 6, wherein the first controller is configured to transmit a second wireless signal to the second controller, the second wireless signal including information relating to synchronization, the second controller being configured to receive the second wireless signal from the first controller and to control the second element driver in response to the second wireless signal.

8. The light-emitting assembly of claim 6, wherein the first controller is configured to transmit a third wireless signal to the second controller, the third wireless signal including diagnostic information, the second controller being configured to receive the third wireless signal from the first controller and to control the second element driver in response to the third wireless signal.

9. The light-emitting assembly of claim 6, wherein the substrate is a printed circuit board configured to receive the first light-emitting element, the second light-emitting element, the first element driver, the second element driver, the first controller, the second controller, and the receptacle.

10. The light-emitting assembly of claim 6, wherein the substrate is a flex circuit configured to receive the first light-emitting element, the second light-emitting element, the first element driver, the second element driver, the first controller, the second controller, and the receptacle.

11. The light-emitting assembly of claim 6, wherein the first controller is configured to receive a fourth wireless signal from a system controller, the fourth wireless signal comprising instructions relating to control of any component selected from the group consisting of the first light-emitting element, the second light-emitting element, the first controller, the second controller, the first element driver, the second element driver, and any combination thereof.

12. The light-emitting assembly of claim 6, wherein the substrate subassembly comprises a receptacle attached to the substrate, the receptacle being in communication with the controller and being configured to receive a plug.

13. The light-emitting assembly of claim 12, comprising a backing plate having an aperture positioned and configured to allow access to the receptacle.

14. The light-emitting assembly of claim 13, comprising a housing configured to contain the substrate subassembly and the backing plate.

15. The light-emitting assembly of claim 14, comprising a support component, and wherein the housing is configured to attach to the support component.

* * * * *